(12) United States Patent
Lee

(10) Patent No.: US 11,886,243 B2
(45) Date of Patent: Jan. 30, 2024

(54) DISPLAY DEVICE

(71) Applicant: Samsung Display Co., LTD., Yongin-si (KR)

(72) Inventor: Ji Heon Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 24 days.

(21) Appl. No.: 17/518,596

(22) Filed: Nov. 4, 2021

(65) Prior Publication Data
US 2022/0269307 A1    Aug. 25, 2022

(30) Foreign Application Priority Data

Feb. 24, 2021    (KR) ......................... 10-2021-0024587

(51) Int. Cl.
     G06F 1/16      (2006.01)
(52) U.S. Cl.
     CPC .......... G06F 1/1624 (2013.01); G06F 1/1616 (2013.01); G06F 1/1681 (2013.01)
(58) Field of Classification Search
None
See application file for complete search history.

(56) References Cited

U.S. PATENT DOCUMENTS

| 8,787,016 | B2* | 7/2014 | Rothkopf | H04M 1/0268 |
| | | | | 361/679.55 |
| 10,079,270 | B2 | 9/2018 | Lee | |
| 11,256,304 | B2* | 2/2022 | Mehandjiysky | H04M 1/0268 |
| 2013/0010405 | A1* | 1/2013 | Rothkopf | H05K 5/0226 |
| | | | | 361/679.01 |
| 2013/0342094 | A1* | 12/2013 | Walters | G06F 1/1681 |
| | | | | 312/319.2 |
| 2015/0366089 | A1 | 12/2015 | Park et al. | |
| 2015/0378557 | A1* | 12/2015 | Jeong | G06F 1/1652 |
| | | | | 715/835 |
| 2016/0381014 | A1* | 12/2016 | Kim | G06F 3/041 |
| | | | | 726/7 |
| 2018/0375975 | A1* | 12/2018 | Kikuchi | G06F 1/1686 |

FOREIGN PATENT DOCUMENTS

| CN | 110718154 | 1/2020 |
| EP | 2728434 | 5/2014 |
| EP | 3109847 | 12/2016 |
| EP | 3155498 | 4/2017 |
| KR | 10-2016-0127277 | 11/2016 |
| KR | 10-2020-0095307 | 8/2020 |

OTHER PUBLICATIONS

Extended European Search Report dated Jun. 13, 2022, issued in European Patent Application No. 21217327.2.

* cited by examiner

*Primary Examiner* — Anthony Q Edwards
*Assistant Examiner* — Rashen E Morrison
(74) *Attorney, Agent, or Firm* — H.C. Park & Associates, PLC

(57) ABSTRACT

A display device includes a display panel includes a first surface where images are displayed, and a second surface opposite to the first surface, the display panel being folded with a curvature, and a sliding member disposed on the second surface of the display panel and configured to slide a part of the display panel so that the curvature of the display panel is changed.

20 Claims, 14 Drawing Sheets

FM: HG, BS1, BS2, BS3

DISPLAY DEVICE

CROSS REFERENCE TO RELATED APPLICATION

This application claims priority from and the benefit of Korean Patent Application No. 10-2021-0024587, filed on Feb. 24, 2021, which is hereby incorporated by reference for all purposes as if fully set forth herein.

BACKGROUND

Field

Embodiments of the invention relate generally to a display device.

Discussion of the Background

Display devices have become more and more important as multimedia technology evolves. Accordingly, a variety of types of display devices such as liquid-crystal display (LCD) devices and organic light-emitting display (OLED) devices are currently used.

Display devices become more and more important as multimedia technology evolves. Accordingly, a variety of types of display devices such as liquid-crystal display (LCD) devices and organic light-emitting display (OLED) devices are currently used.

A mobile electronic device includes a display device for providing an image to a user. Recently, a bendable display device, a foldable display device, a rollable display device, a slidable display device, etc., which employ a flexible display panel that can be bent, folded or rolled, have been developed. In designing such display devices, it is important to reduce stress applied to the flexible display panel.

The above information disclosed in this Background section is only for understanding of the background of the inventive concepts, and, therefore, it may contain information that does not constitute prior art.

SUMMARY

Devices constructed according to embodiments of the invention are capable of changing a curvature of a foldable display panel of a display device to reduce an amount of stress that may be applied to the display device.

Aspects of the present disclosure provide a display device capable of reducing stress applied to a display panel.

Additional features of the inventive concepts will be set forth in the description which follows, and in part will be apparent from the description, or may be learned by practice of the inventive concepts.

According to an embodiment, there is provided a display device including: a display panel comprising a first surface where images are displayed, and a second surface opposite to the first surface, the display panel being folded with a curvature, and a sliding member disposed on the second surface of the display panel and configured to slide a part of the display panel so that the curvature of the display panel is changed.

According to another embodiment, there is provided a display device including: a display panel comprising a first surface where images are displayed, and a second surface opposite to the first surface, wherein the display device is able to transit between a first state in which the display panel is flatly unfolded, a second state in which the display device is folded so that the first surface of the display panel is not exposed to an outside, and a third state in which a part of the display panel slides relative to another part thereof from the second state so that only a part of the first surface of the display panel is exposed, and wherein the display panel has a first curvature in the second state and a second curvature smaller than the first curvature in the third state.

According to an embodiment, it is possible to mitigate stress applied to a display panel of a display device.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION OF THE EMBODIMENTS

Figure 1:
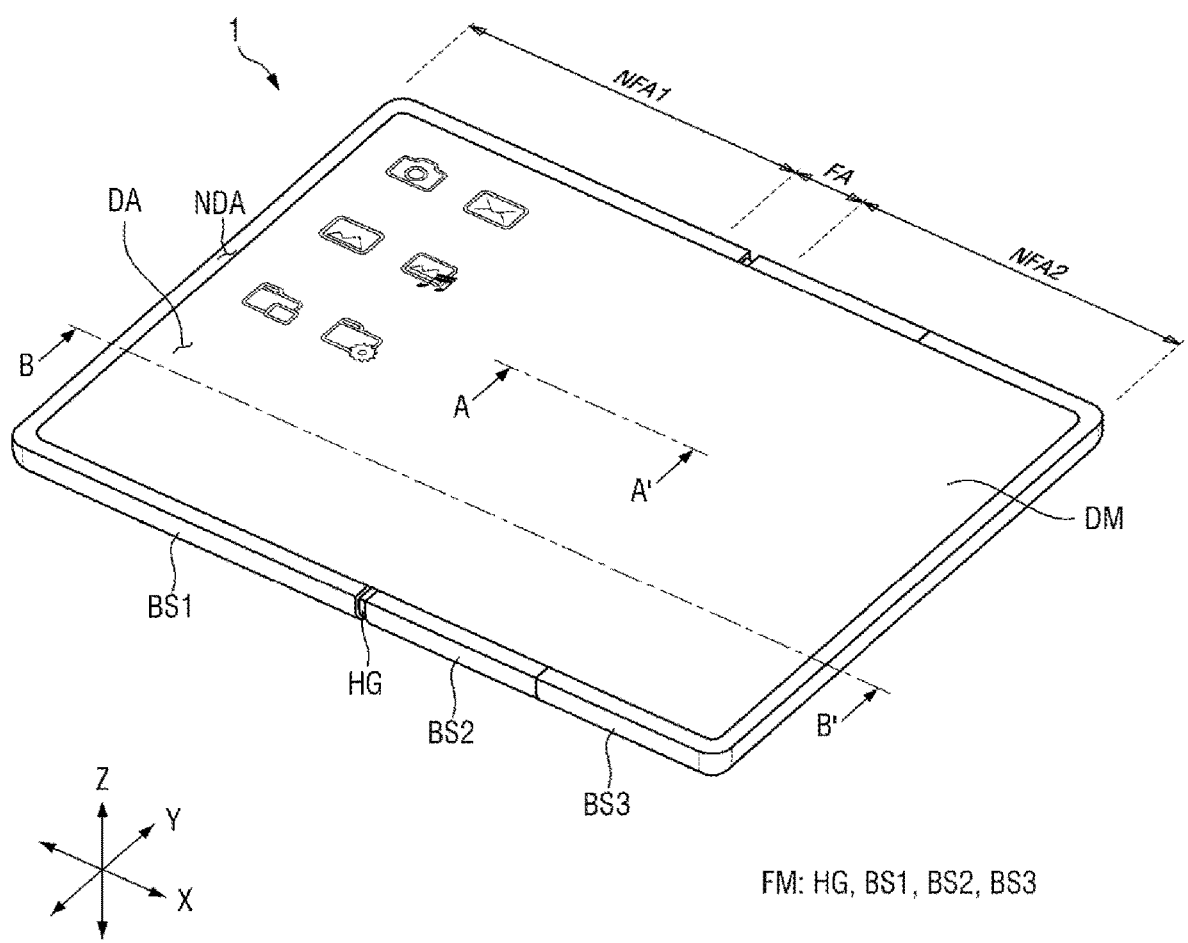
FIG. 1 is a perspective view of a display device constructed according to principles of the invention according to an embodiment in a first state.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Figure 2:
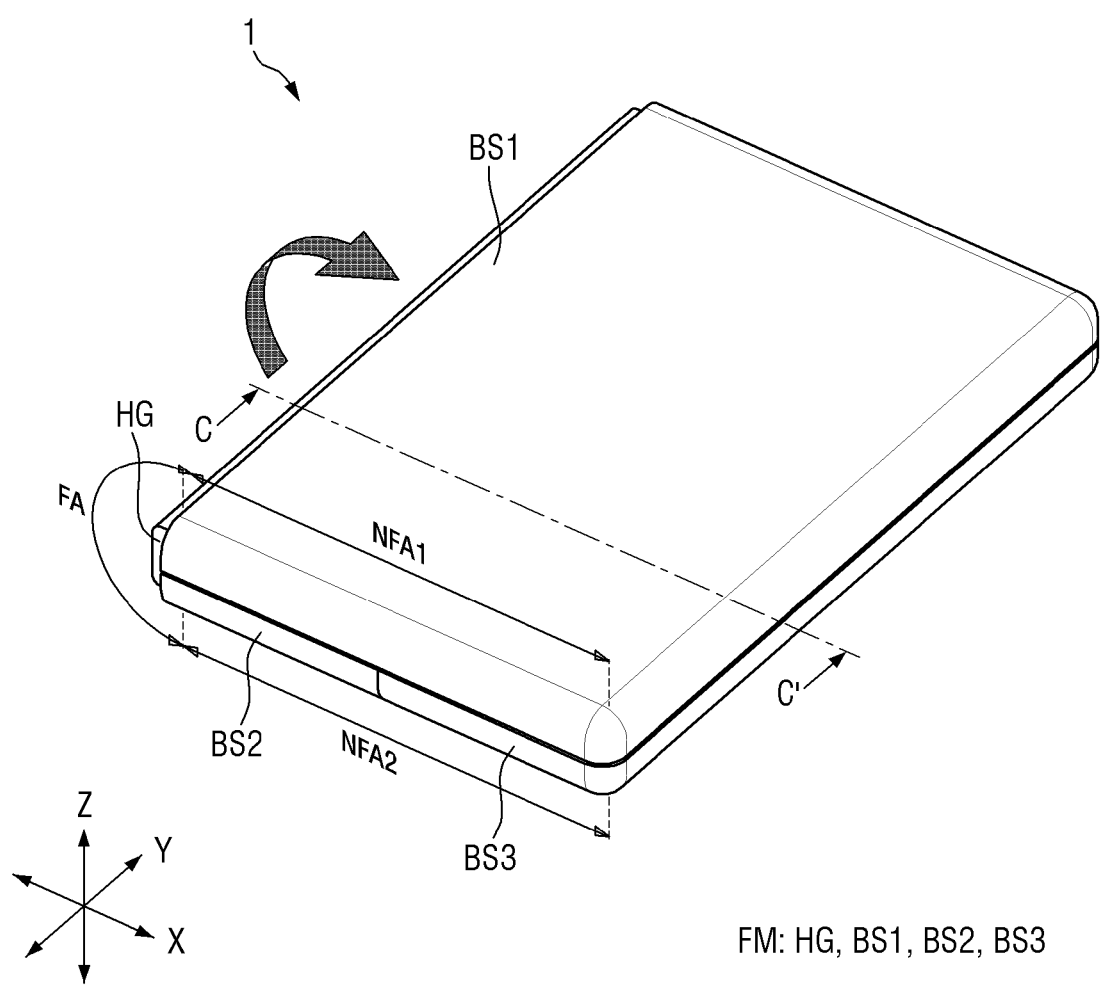
FIG. 2 is a perspective view of the display device according to the embodiment in a second state.
Figure 3:
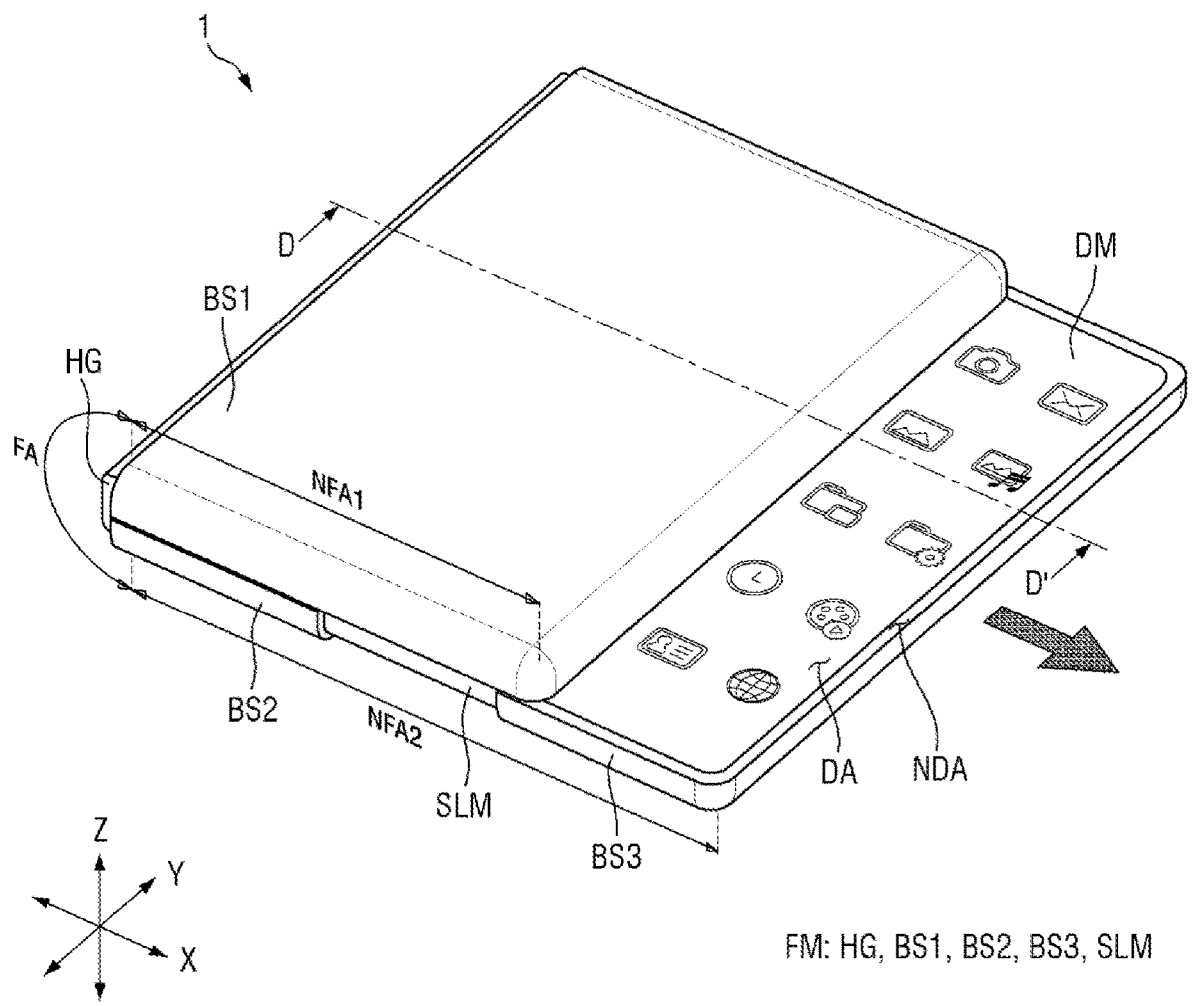
FIG. 3 is a perspective view of the display device according to the embodiment in a third state.

FIG. 1 is a perspective view of a display device according to an embodiment in a first state. FIG. 2 is a perspective view of the display device according to the embodiment in a second state. FIG. 3 is a perspective view of the display device according to the embodiment in a third state.

A display device 1 constructed according to principles of an embodiment may include a variety of devices that display images or videos. Examples of the display device 1 include, but are not limited to, a smart phone, a mobile phone, a tablet PC, a personal digital assistant (PDA), a portable multimedia player (PMP), a television set, a game machine, a wristwatch-type electronic device, a head-mounted display, a personal computer monitor, a laptop computer, a car navigation system, a car instrument cluster, a digital camera, a camcorder, an outdoor billboard, an electronic billboard, various medical apparatuses, various inspection devices, various home appliances including a distance such as a refrigerator and a laundry machine, Internet of things (IoT) devices, etc.

Referring to FIG. 1, the display device 1 may have a rectangular shape when viewed from the top. According to an embodiment, the display device 1 may have two longer sides extended in the first direction X and two shorter sides extended in the second direction Y intersecting the first direction X when viewed from the top. It should be understood that the present disclosure is not limited thereto. The display device 1 may have a variety of shapes.

The display device 1 may include a display area DA and a non-display area NDA.

The display area DA may display images or videos. A plurality of pixels may be disposed in the display area DA. As shown in FIG. 1, the display area DA may be disposed on the upper surface of display device 1. It is, however, to be understood that the present disclosure is not limited thereto. The display area DA may be further disposed on at least one of the lower surface and side surfaces of the display device 1.

The non-display area NDA may not display any image or video. The non-display area NDA may be disposed around the display area DA. The non-display area NDA may surround the display area DA. The non-display area NDA may be an area in which a light-blocking member such as a black matrix is disposed. According to an embodiment, the display area DPA may have a rectangular shape, and the non-display area NDA may be disposed along the four sides of the display area DA. It is, however, to be understood that the present disclosure is not limited thereto.

Referring to FIGS. 1 and 2, the display device 1 may be a foldable device that can be folded or unfolded.

The display device 1 may be divided into the folding area FA and non-folding areas NFA1 and NFA2.

The folding area FA may be an area that is folded or bent when the display device 1 is folded. The non-folding areas NFA1 and NFA2 may be areas that remain flat without being folded or bent even when the display device 1 is folded.

The non-folding areas NFA1 and NFA2 may include a first non-folding area NFA1 and a second non-folding area NFA2.

The first non-folding area NFA1 and the second non-folding area NFA2 are arranged in the first direction X, and the folding area FA may be disposed between the first non-folding area NFA1 and the second non-folding area NFA2.

The display device 1 may be folded so that the first non-folding area NFA1 overlaps the second non-folding area NFA2 or the first non-folding area NFA1 is inclined respect to the second non-folding area NFA2, or may be unfolded flat. For example, the display device 1 may be folded so that the first non-folding area NFA1 forms an angle approximately greater than 0° and less than 180° with respect to the second non-folding area NFA2, or may be unfolded so that they form an angle of approximately 180°.

As shown in FIG. 1, when the display device 1 is unfolded, the first non-folding area NFA1, the folding area FA and the second non-folding area NFA2 may spread out flat so that they do not overlap each other in the thickness direction. As shown in FIG. 2, when the display device 1 is folded, the first non-folding area NFA1 and the second non-folding area NFA2 may overlap each other in the thickness direction. When the display device 1 is folded, the first non-folding area NFA1 and the second non-folding area NFA2 may be disposed such that they are inclined with respect to each other. In such case, at least a part of the first non-folding area NFA1 and at least a part of the second non-folding area NFA2 may or may not overlap each other in the thickness direction.

According to an embodiment, one folding area FA and two non-folding areas NFA1 and NFA2 are illustrated, but the numbers and arrangements of the folding area FA and the non-folding areas are not limited thereto. In some implementations, each of the elements of the display device 1 may also be divided into the folding area FA and/or the non-folding areas NFA1 and NFA2.

As shown in FIG. 2, the display device 1 may be folded inward. When the display device is folded inward, at least a part of the display area DA is not exposed to the outside. For example, the display device 1 may be folded so that a part of the display area DA faces another part of the display area DA, and the display area DA may be surrounded by at least one other element forming the exterior of the display device 1 so that the display area DA is not exposed to the outside.

It is, however, to be understood that the embodiments described herein are not limited thereto. The display device 1 may be folded outward. The display area DA may be exposed to the outside (i.e., have an exposed area) when the display device is folded outward. For example, the display device 1 may be folded such that a part of the display area DA does not face another part of the display area DA and the display area DA is exposed to the outside to form the exterior of the display device 1. The display device 1 may be an in-and-out folding device, i.e., a device capable of being folded inward and outward.

Referring to FIGS. 1 to 3, when the display device 1 is folded, a part of the display area DA may be drawn out from the display device 1 and exposed to the outside. In such case, another part of the display area DA may be located inside the display device 1 and may not be exposed to the outside. In addition, the part of the display area DA exposed to the outside may be drawn back into the display device 1 so that it is not exposed to the outside. The display area DA may refer to a display module DM to be described later.

At least one of the elements of the display device 1 may slide so that a part of the display area DA is exposed to the outside. As will be described later with reference to FIGS. 6 to 10, the display area DA may be drawn in and out as the display module DM providing the display area DA and a folding member FM supporting it slide.

Referring to FIGS. 1 to 3, the display device 1 may have a first state in which the display device 1 is unfolded, a second state in which the display device 1 is folded, and a third state in which a part of the display device 1 slides. The display device 1 may be configured so that it can freely transit from one of the first state, the second state and the third state to another of those states.

In the first state, the first non-folding area NFA1 and the second non-folding area NFA2 may be located side by side on one plane. In the second state, the first non-folding area NFA1 and the second non-folding area NFA1 may be arranged in parallel to each other and completely overlap each other in the thickness direction. In the third state, the first non-folding area NFA1 and the second non-folding area NFA2 may be arranged in parallel to each other but may not completely overlap each other in the thickness direction.

The first state, the second state and the third state may refer to a state in which the display area DA is completely exposed to the outside, a state in which the display area DA is not exposed to the outside, and a state in which only a part of the display area DA is exposed to the outside, respectively.

The second state may include a state in which the display device 1 is completely folded, a state in which the display device 1 is half-folded, an in-folding state in which the display device 1 is folded inward, and an out-fold state in which the display device 1 is folded outward. The third state may be a state in which a part of the display device 1 slides so that at least one of the first non-folding area NFA1 and the second non-folding area NFA2 is extended.

For example, in the first state, the angle between the first non-folding area NFA1 and the second non-folding area NFA2 of the display device 1 may be approximately 180°. In the second state and/or third state, the angle between the first non-folding area NFA1 and the second non-folding area NFA2 of the display device 1 may be approximately 0° or more and less than 180° and/or approximately more than 180° and less than 360°.

Referring to FIGS. 1 to 3, the display device 1 may include the display module DM and the folding member FM.

The display module DM and the folding member FM may be disposed across the first non-folding area NFA1, the folding area FA, and the second non-folding area NFA2. The display module DM may form the upper surface of the display device 1, and the folding member FM may be disposed on the lower surface of the display module DM to support the display module DM. The display module DM may be flexible so that at least a part thereof may be bent. The folding member FM may be configured to bend the display module DM by a force applied from the outside.

The folding member FM may include a hinge member HG, a first base member BS1, a second base member BS2, and a third base member BS3.

The hinge member HG may be disposed mainly in the folding area FA. The hinge member HG may provide at least one rotation axis. The first base member BS1 and the second base member BS2 may rotate around the at least one rotation axis. The hinge member HG may include a mechanical hinge and an elastic hinge. For example, the hinge member HG may include at least one member for folding the display device 1, such as a hinge, a shaft member SFT, a rotor, and a cam.

The first base member BS1 may be disposed mainly in the first non-folding area NFA1. One side of the first base member BS1 may be rotatably connected to one side of the hinge member HG.

The second base member BS2 and the third base member BS3 may be disposed mainly in the second non-folding area NFA2. One side of the second base member BS2 may be rotatably connected to the other side of the hinge member HG. The third base member BS3 may be disposed on the other side of the second base member BS2.

The second base member BS2 and the third base member BS3 may have a smaller size than the first base member BS1. The sum of the areas of the second base member BS2 and the third base member BS3 may be substantially equal to the area of the first base member BS1 when viewed from the top. Accordingly, as shown in FIG. 2, when the display device 1 is folded, the edge of the first base member BS1 may be aligned with the edge of the second base member BS2 and the edge of the third base member BS3 forming the edge of the display device 1.

Although the first base member BS1, the second base member BS2 and the third base member BS3 are cover members forming the exterior of the display device 1 in the example shown in FIGS. 1 to 3, the present disclosure is not limited thereto. The first base member BS1, the second base member BS2 and/or the third base member BS3 may include other elements forming the display device 1 than the display module DM, for example, a protection member for protecting the display module DM, a frame member for mounting electronic components, etc. For another example, the first base member BS1, the second base member BS2 and/or the third base member BS3 may form a part of the hinge member HG.

Figure 4:
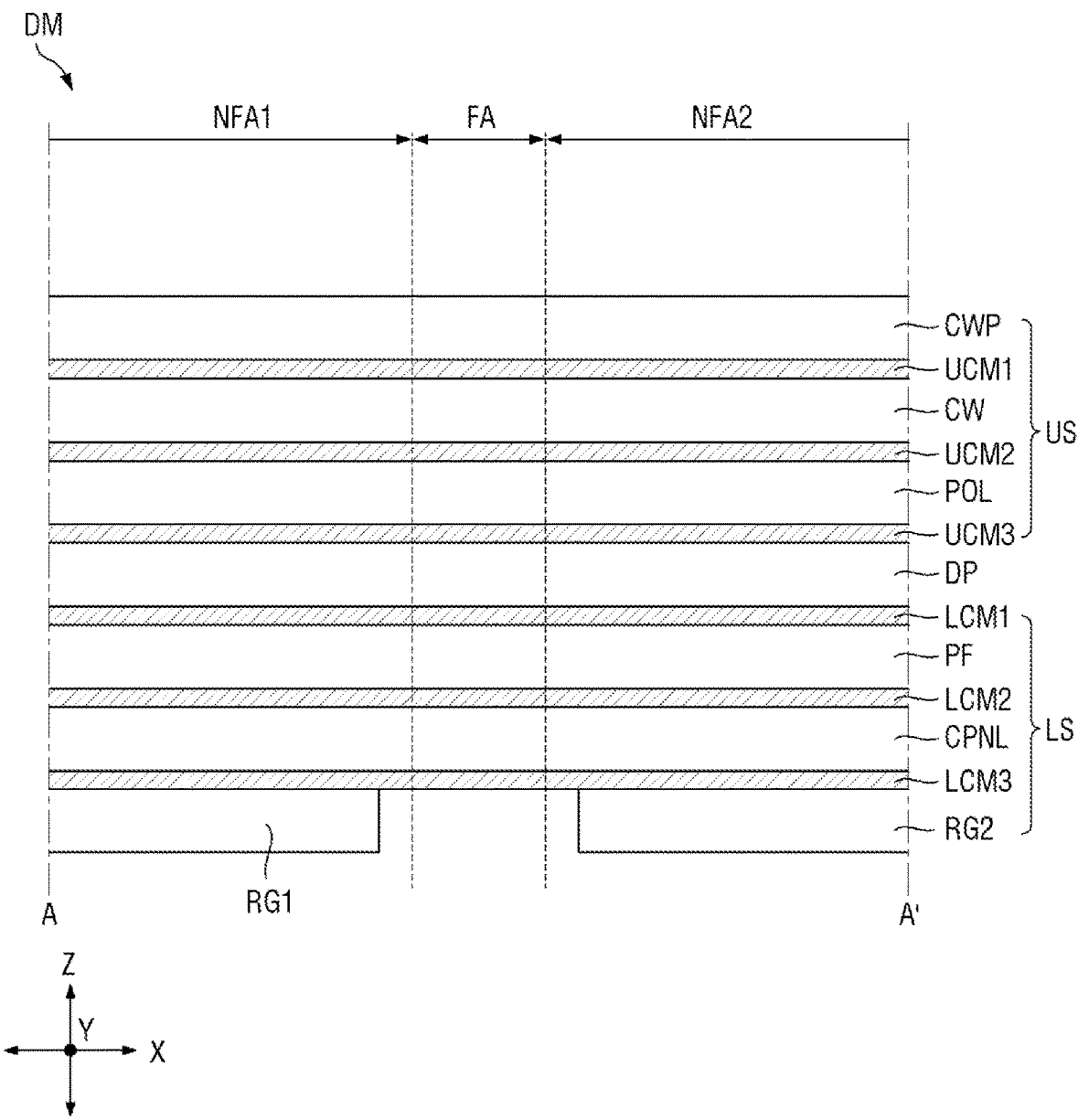
FIG. 4 is a cross-sectional view of the display panel, taken along line A-A' of FIG. 1.
Figure 5:
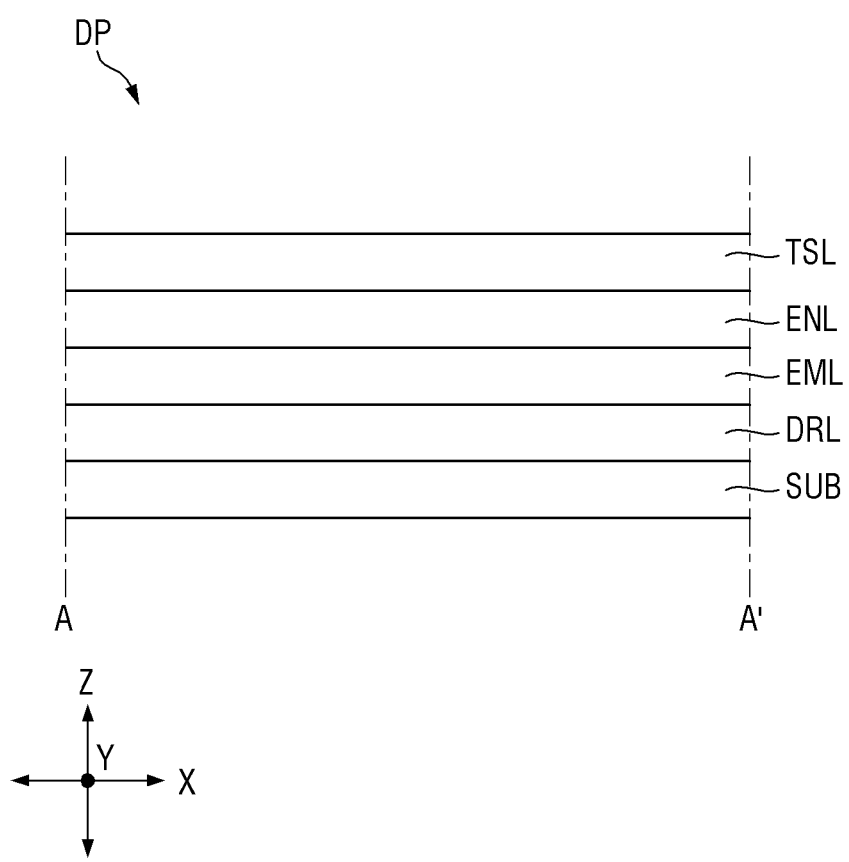
FIG. 5 is a cross-sectional view of the display panel of FIG. 4.

FIG. 4 is a cross-sectional view of the display panel, taken along line A-A' of FIG. 1. FIG. 5 is a cross-sectional view of the display panel of FIG. 4.

Referring to FIG. 4, the display device 1 may include an upper stack structure US stacked on the upper surface of the display panel DP, and a lower stack structure LS stacked on the lower surface of the display panel DP.

The upper surface of the display panel DP may be the surface where image or video is displayed, and the lower surface of the display panel DP may be the surface opposite to the upper surface.

The display panel DP, the upper stack structure US and the lower stack structure LS may be disposed across the first non-folding area NFA1, the folding area FDA, and the second non-folding area NFA2. At least one of the members forming the upper stacked structure US and the lower stacked structure LS may be separated at the folding area FA. As they are separated, stress generated when the display device 1 is folded can be mitigated.

The display panel DP displays images and may include a self-luminous display panel such as an organic light-emitting display panel (OLED), an inorganic light-emitting display panel (inorganic EL), a quantum-dot light-emitting display panel (QED), a micro LED display panel (micro-LED), a nano LED display panel (nano-LED), a plasma display panel (PDP), a field emission display panel (FED) and a cathode ray display panel (CRT), as well as a light-receiving display panel such as a liquid-crystal display panel (LCD) and an electrophoretic display panel (EPD)

The display panel DP may further include a touch member. The touch member may be implemented as a panel or film separated from the display panel DP to be attached on the display panel DP or may be implemented in the form of a touch layer inside the display panel DP. Although the touch member is provided inside the display panel DP to be included in the display panel DP in the following description, it is to be understood that the present disclosure is not limited thereto.

Referring to FIG. 5, the display panel DP may include a substrate SUB, a circuit-driving layer DRL on the substrate SUB, an emissive layer EML on the circuit-driving layer DRL, an encapsulation layer ENL on the emissive layer EML, and a touch layer TSL on the encapsulation layer ENL.

The substrate SUB may be a flexible substrate including a flexible polymer material such as polyimide. Accordingly, the display panel DP may be curved, bent, folded, or rolled.

The circuit-driving layer DRL may be disposed on the substrate SUB. The circuit-driving layer DRL may include a circuit for driving an emissive layer EML of each pixel. The circuit-driving layer DRL may include a plurality of thin-film transistors.

The emissive layer EML may be disposed on the circuit-driving layer DRL. The emissive layer EML may include an organic emitting layer. The emissive layer EML may emit light with various luminances depending on driving signals transmitted from the circuit-driving layer DRL.

The encapsulation layer ENL may be disposed on the emissive layer EML. The encapsulation layer ENL may include an inorganic film or a stack of an inorganic film and an organic film.

The touch layer TSL may be disposed on the encapsulation layer ENL. The touch layer TSL may sense a touch input and may perform the functions of the touch member. The touch layer TSL may include a plurality of sensing regions and sensing electrodes.

Referring back to FIG. 4, the upper stack structure US may include a polarizing member POL, a cover window CW and a cover window protection layer CWP sequentially stacked on one another from the display panel DP toward the upper side.

The polarizing member POL may be disposed on the upper surface of the display panel DP. The polarizing member POL may polarize the light passing therethrough. The polarizing member POL can reduce the reflection of external light. The polarizing member POL may be a polarizing film. The polarizing member POL may be replaced by a plurality of color filters and a black matrix disposed therebetween.

The cover window CW may be disposed on the upper surface of the polarizing member POL. The cover window CW serves to protect the display panel DP. The cover window CW may be made of a transparent material. The cover window CW may include, for example, glass or plastic. According to an embodiment, the cover window CW may be made of, but is not limited to, glass.

The cover window protection layer CWP may be disposed on the upper surface of the cover window CW. The cover window protection layer CWP may be implemented as a transparent polymer film including for example, at least one selected from the group consisting of: polyethylene terephthalate (PET), polyethylene naphthalate (PEN), polyether sulfone (PES), polyimide (PI), polyarylate (PAR), polycarbonate (PC), polymethyl methacrylate (PMMA) and cyclo olefin copolymer (COC) resin.

The upper stack structure US may include upper coupling members UCM1, UCM2 and UCM3 that couple the adjacent ones of the elements stacked on one another. The upper coupling members UCM1, UCM2 and UCM3 may be optically transparent. The upper coupling members UCM1, UCM2 and UCM3 may include an optically clear adhesive, an optically clear resin, and a pressure sensitive adhesive (PSA). According to an embodiment, a first upper coupling member UCM1 may be disposed between the cover window protection layer CWP and the cover window CW to couple them, a second upper coupling member UCM2 may be disposed between the cover window CW and the polarizing member POL to couple them, and a third upper coupling member UCM3 may be disposed between the polarizing member POL and the display panel DP to couple them.

The lower stack structure LS may include a polymer film layer PF, a cover panel CPNL, and rigid members RG1 and RG2 sequentially stacked on one another from the display panel DP toward the lower side.

The polymer film layer PF may be disposed on the lower surface of the display panel DP. The polymer film layer PF can protect the display panel DP. The polymer film layer PF may include, for example, polyimide (PI), polyethylene terephthalate (PET), polycarbonate (PC), polyethylene (PE), polypropylene (PP), polysulfone (PSF), polymethyl methacrylate (PMMA), triacetyl cellulose (TAC), cycloolefin polymer (COP), etc.

The cover panel CPNL may be disposed on the lower surface of the polymer film layer PF. The cover panel CPNL may include a plurality of layers, and each of the plurality of layers may be made of a rigid material or an elastic material. The cover panel CPNL may perform a function of supporting the display panel DP, a function of reinforcing the rigidity of the display panel DP, and a function of buffering an impact applied to the display panel DP.

The cover panel CPNL may include at least one functional layer. The functional layer may include, for example, at least one of a digitizer, an electromagnetic wave shielding layer, a shock-absorbing layer, and a heat-dissipating layer.

The rigid members RG1 and RG2 may be disposed on the lower surface of the cover panel CPNL. The rigid members RG1 and RG2 may include a first rigid member RG1 and a second rigid member RG2 that are spaced apart from each other with respect to the folding area FA. The first rigid member RG1 and the second rigid member RG2 may serve to support the elements stacked in the first non-folding area NFA1 and the second non-folding area NFA2, respectively. The rigid members RG1 and RG2 may include a metal. For example, the rigid members RG1 and RG2 may be metal plates. The rigid members RG1 and RG2 may work as heat dissipating members that discharge heat generated by the display module DM to the outside.

An edge of the first rigid member RG1 and an edge of the second rigid member RG2 adjacent to the folding area may be disposed in the first non-folding area NFA1 and the second non-folding area NFA2, respectively. In such case, the edge of the first rigid member RG1 and/or the edge of the second rigid member RG2 may be spaced apart from the boundary of the folding area FA. Accordingly, there may be space in which the support member SF, the sliding member SLM and/or the plate member WP are disposed on the lower surface of other elements stacked on the rigid members RG1 and RG2 in the first non-folding area NFA1 and/or the second non-folding area NFA2. It should be understood that the embodiments described herein are not limited thereto. The edge of the first rigid member RG1 and the edge of the second rigid member RG2 may be aligned with the boundary of the folding area FA.

The lower stack structure LS may further include lower coupling members LCM1, LCM2 and LCM3 that couple adjacent ones of the elements stacked on one another. For example, a first lower coupling member LCM1 may be disposed between the display panel DP and the polymer film layer PF to couple them, a second lower coupling member LCM2 may be disposed between the polymer film layer PF and the cover panel CPNL to couple them, and a third lower coupling member LCM3 may be disposed between the cover panel CPNL and the rigid members RG1 and RG2.

Figure 6:
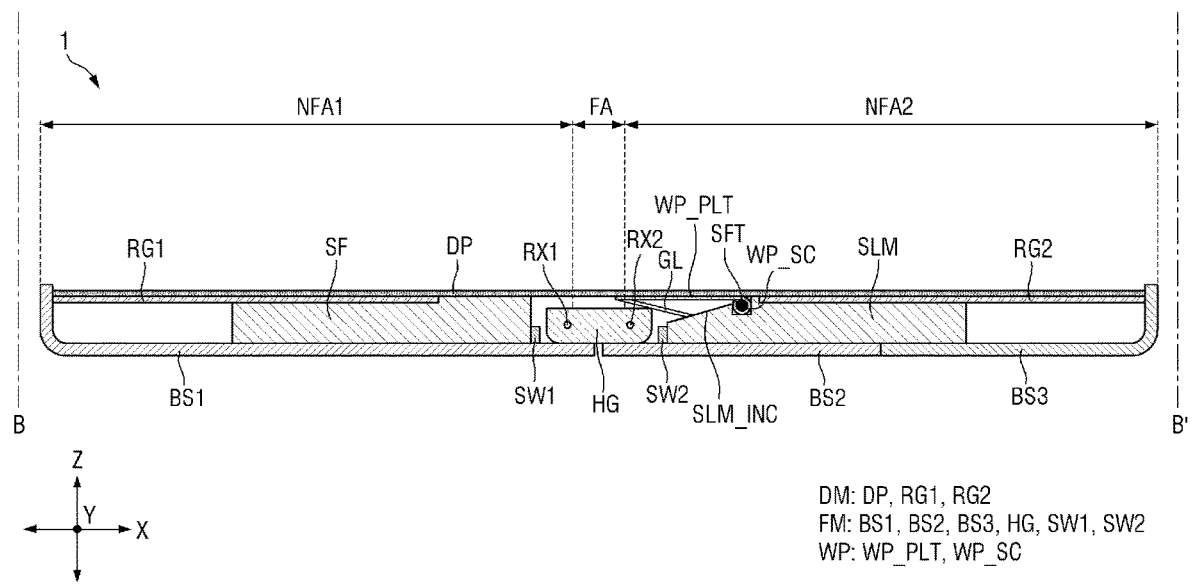
FIG. 6 is a cross-sectional view taken along line B-B' of FIG. 1.
Figure 7:
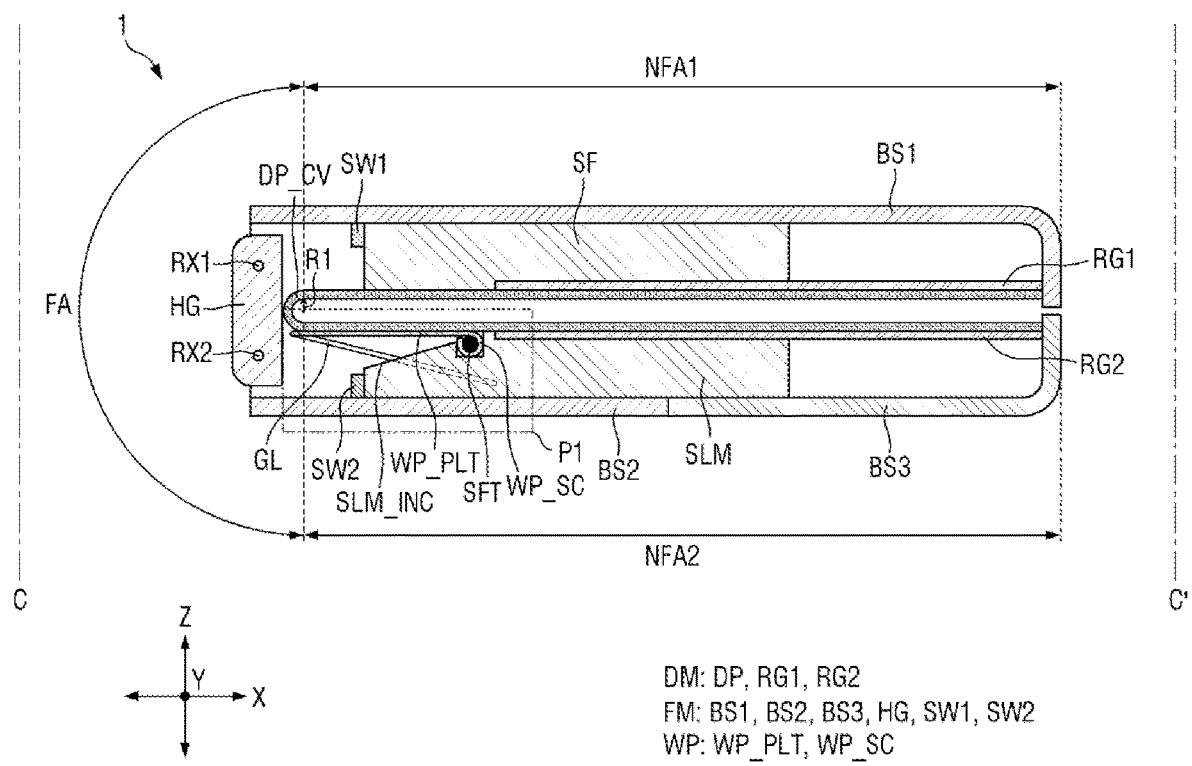
FIG. 7 is a cross-sectional view taken along line C-C' of FIG. 2.
Figure 8:
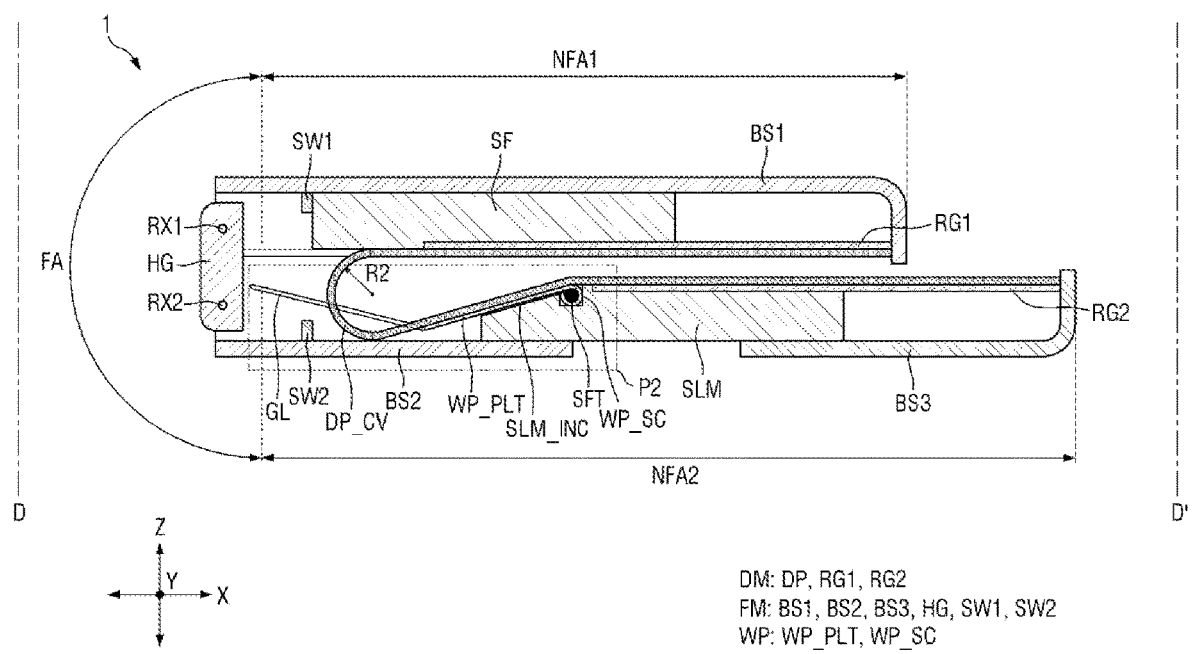
FIG. 8 is a cross-sectional view taken along line D-D' of FIG. 3.
Figure 9:
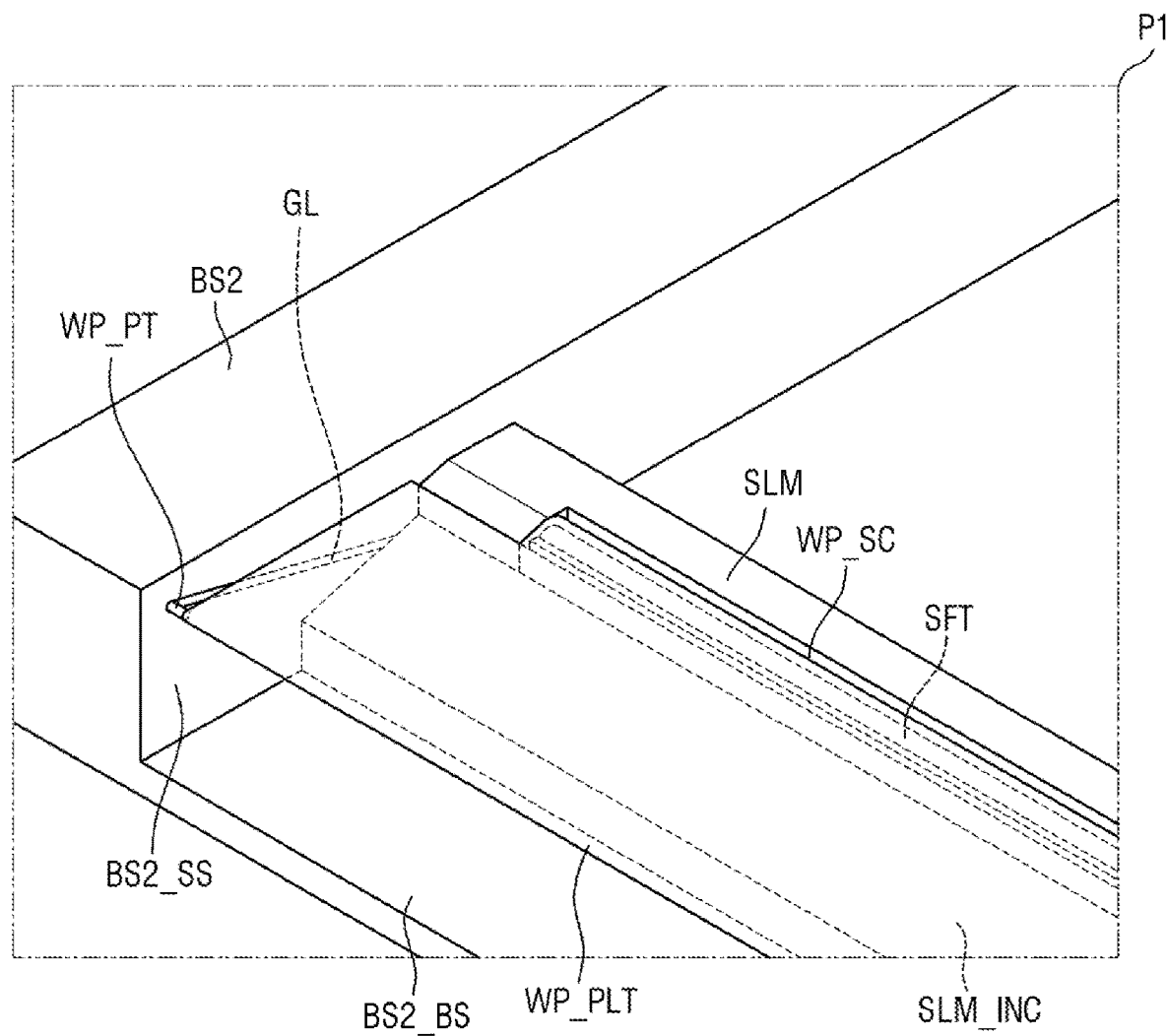
FIG. 9 is an enlarged perspective view of portion P1 of FIG. 7.
Figure 10:
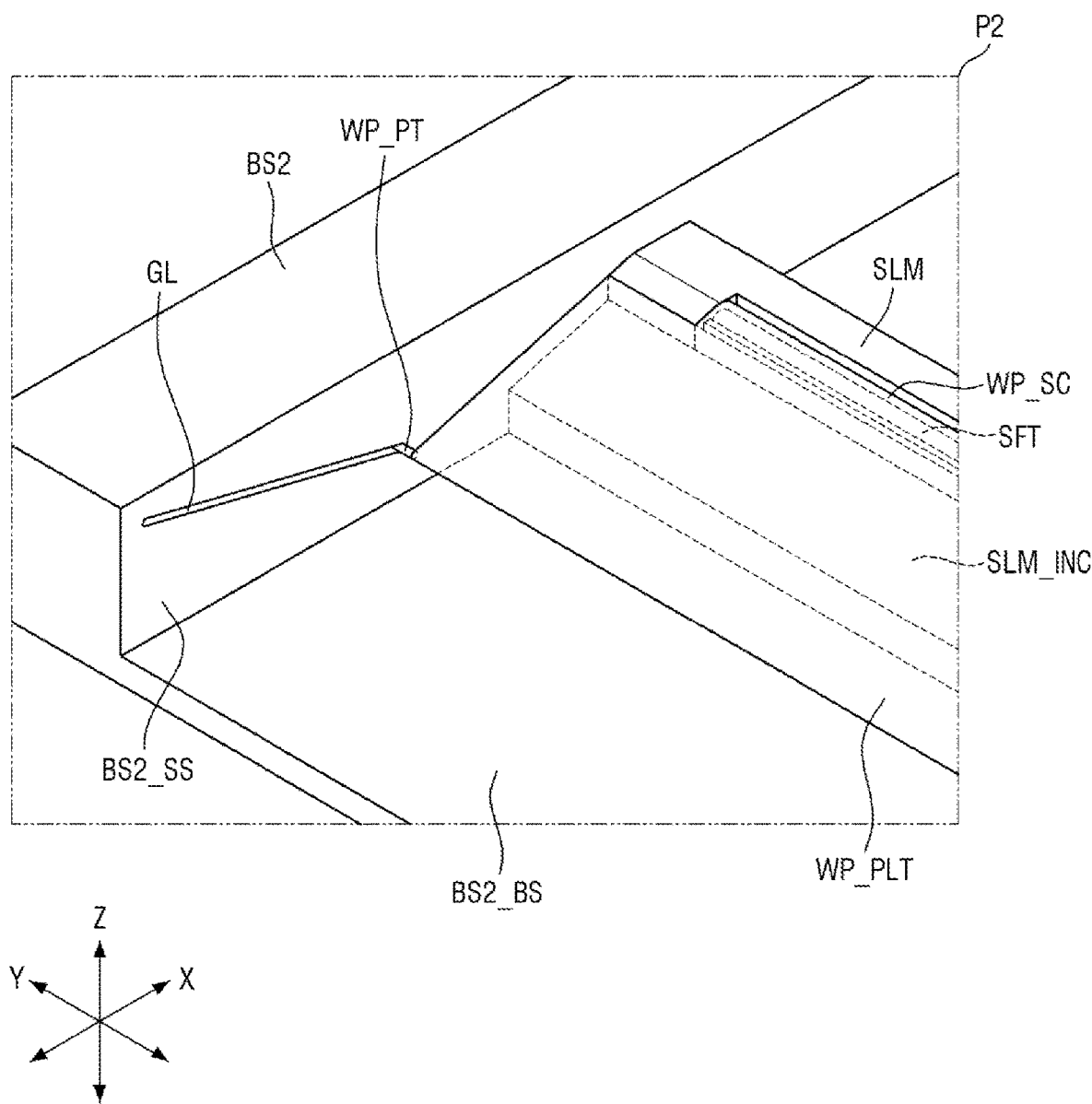
FIG. 10 is an enlarged perspective view of portion P2 of FIG. 8.

FIG. 6 is a cross-sectional view taken along line B-B' of FIG. 1. FIG. 7 is a cross-sectional view taken along line C-C' of FIG. 2. FIG. 8 is a cross-sectional view taken along line D-D' of FIG. 3. FIG. 9 is an enlarged perspective view of portion P1 of FIG. 7. FIG. 10 is an enlarged perspective view of portion P2 of FIG. 8.

In the following description, the other elements than the display panel DP and the rigid members RG1 and RG2 of the display module DM are not depicted in FIGS. 6 to 8 for the sake of clarity. The following description will focus on the display panel DP of the display module DM. The display panel DP may refer to the entire display module DM including it, or may refer to at least one of the display panel DP, the upper stack structure US and the lower stack structure LS.

Referring to FIGS. 6 to 10, as described above, the hinge member HG may be disposed mainly in the folding area FA, the first base member BS1 may be disposed mainly in the first non-folding area NFA1, and the second base member BS2 and the third base member BS3 may be disposed mainly in the second non-folding area NFA2.

The hinge member HG may provide a first rotation axis RX1 and a second rotation axis RX2 that are spaced apart from each other and extended in the second direction Y. As shown in FIGS. 7 and 8, the first base member BS1 may rotate around the first rotation axis RX1, and the second base member BS2 may rotate around the second rotation axis RX2. The third base member BS3 may be connected to the second base member BS2 by another member such as the sliding member SLM to rotate around the second rotation axis RX2 together with the second base member BS2. The first rotation axis RX1 and the second rotation axis RX2 may be imaginary axes disposed outside the hinge member HG.

As shown in FIGS. 6 to 8, each of the first base member BS1, the second base member BS2 and the third base member BS3 may include a space recessed in the thickness direction. The support member SF, the hinge member HG, the sliding member SLM and the plate member WP may be mounted in the space. It is to be noted that the shapes of the first base member BS1, the second base member BS2 and the third base member BS3 are not limited thereto.

Referring to FIGS. 6 to 10, the display device 1 may further include the sliding member SLM and the plate member WP disposed on the lower surface of the display module DM.

The sliding member SLM and the plate member WP may be disposed in the second non-folding area NFA2. It should be understood that the embodiments described herein are not limited thereto. At least one of the sliding member SLM and the plate member WP may be partially disposed in the folding area FA.

The sliding member SLM may be interposed between the second base member BS2 and the display module DM and between the third base member BS3 and the display module DM. The sliding member SLM may slide in a radial direction of the center of curvature of a curved portion DP_CV, the first rotation axis RX1, and/or the second rotation axis RX2. The radial direction may refer to the direction that intersects the first rotation axis RX1 or the second rotation axis RX2 and extended from the first rotation axis RX1 or the second rotation axis RX2 away from the first rotation axis RX1 and/or the second rotation axis RX2. The radial direction may be orthogonal to the first rotation axis RX1 or the second rotation axis RX2, but the embodiments described herein are not limited thereto.

The radial direction of the center of curvature of the curved portion DP_CV, the first rotation axis RX1 and/or the second rotation axis RX2 may include one direction toward the edge of the display panel DP and the other direction opposite to the one direction. The edge of the display panel DP may refer to the edge that is located in the second non-folding area NFA2 and overlapping with at least one of the second rigid member RG2 and the third base member BS3 in the thickness direction. Depending on the design of the display device 1, the edge of the display panel DP may overlap with the sliding member SLM in the thickness direction.

The sliding member SLM may connect the second base member BS2 with the third base member BS3 such that the distance between the second base member BS2 and the third base member BS3 is variable. The distance may be generally the distance in the radial direction of the first rotation axis RX1 and/or the second rotation axis RX2, but the embodiments described herein are not limited thereto.

As shown in FIGS. 6 to 8, a step is formed on the upper portion of the sliding member SLM to seat and fix one side of the second rigid member RG2. The upper portion of the sliding member SLM may be in direct contact with the second rigid member RG2, and the lower portion of the sliding member SLM may be in direct contact with the second base member BS2 and the third base member BS3. It should be understood that the embodiments described herein are not limited thereto.

As shown in FIGS. 7 to 10, the sliding member SLM may be movable relative to the hinge member HG and/or the second base member BS2. The sliding member SLM may be fixed relative to the display module DM and/or the third base member BS3. When the sliding member SLM slides, the display module DM and/or the third base member BS3 may also move relative to the hinge member HG and/or the second base member BS2.

One side of the sliding member SLM facing the hinge member HG may be slidably connected to the second base member BS2, and the opposite side of the sliding member SLM may be fixed to the third base member BS3, with the upper portion of the sliding member SLM fixed to the lower surface of the display panel DM. For example, in FIGS. 6 to 8, one side and the opposite side of the sliding member SLM may be the left portion of the sliding member SLM overlapping the second base member BS2 and the right portion of the sliding member SLM overlapping the third base member BS3, respectively.

One side of the sliding member SLM, the third base member BS3 and the display module DM may move away from or toward the hinge member HG, the first rotation axis RX1 and/or the second rotation axis RX2. For example, the one side of the sliding member SLM, the third base member BS3 and the display module DM may move generally in the radial direction of the first rotation axis RX1 and/or the second rotation axis RX2. It should be understood that the embodiments described herein are not limited thereto. One side of the display module DM may include the edge of the display module DM disposed in the second non-folding area NFA2 and a part of the display module DM adjacent thereto.

The sliding member SLM may include an inclined surface SLM INC disposed on the one side. For example, the sliding member SLM may have a generally rectangular shape in cross section, with a corner on the side facing the hinge member HG obliquely cut out. The side of the sliding member SLM on which the inclined surface SLM INC is formed may be spaced apart from the display module DM to provide a space for rotation of the plate member WP.

The inclined surface SLM INC may be disposed obliquely to the direction in which the sliding member SLM moves and/or the radial direction of the second rotation axis RX2 (the first rotation axis RX1). The inclined surface SLM INC may be inclined so that the thickness of the sliding member SLM decreases toward the hinge member HG. The inclined surface SLM INC may restrict the rotation angle of the plate member WP.

As shown in FIGS. 6 and 7, in the first state and the second state, the sliding member SLM may be accommodated in the second base member BS2 and the third base member BS3 and thus may not be exposed to the outside. As shown in FIG. 8, in the third state, a part of the sliding member SLM may be exposed to the outside between the second base member BS2 and the third base member BS3.

Referring to FIGS. 6 to 10, the plate member WP may be disposed on one side of the sliding member SLM facing the hinge member HG. The plate member WP may be disposed between the hinge member HG and the sliding member SLM. As shown in FIGS. 9 and 10, for example, the plate member WP may be formed as a wing-shaped member which rotates around the shaft member SFT.

As shown in FIGS. 6 to 8, the plate member WP may be disposed on the lower surface of the display module DM to support the display module DM. Specifically, the plate member WP may be disposed to support a part of the display panel DP disposed adjacent to the folding area FA and/or the hinge member HG. A part of the display panel DP may not be covered or supported by the second rigid member RG2. One side of the plate member WP may be rotatably connected to the side of the sliding member SLM that faces the hinge member HG, and the opposite side of the plate member WP may be extended toward the hinge member HG. As shown in FIG. 8, when the sliding member SLM moves, the plate member WP may rotate around the side of the plate member WP. Accordingly, when the display device transits from the second state to the third state (or from the third state to the second state), the curvature of the display module DM (display panel DP) may vary. The curvature may be a reciprocal of the radius of curvature of the curved portion of the display module DM (display panel DP). That is, the curvature may increase with reduced radius, and the curvature may decrease with increased radius.

Referring to FIGS. 6 to 10, the plate member WP may include a plate portion WP_PLT and a shaft coupling portion WP_SC.

The plate portion WP_PLT may be made of a flat plate-shaped member to support the lower surface of the display module DM (display panel DP). As shown in FIGS. 8 and 10, when the display device transits to the third state, the plate portion WP_PLT may be seated on the inclined surface SLM INC of the sliding member SLM.

The shaft coupling portion WP_SC may be disposed on one side of the plate portion WP_PLT to rotatably couple the plate portion WP_PLT with the shaft member SFT to be described later.

The shaft coupling portion WP_SC may be disposed to surround the shaft member SFT, and may have, for example, a rounded outer circumferential surface in a cylindrical shape conforming to the shape of the outer circumferential surface of the shaft member SFT. Accordingly, it is possible to prevent damage to the display module DM when it is in contact with the shaft member SFT.

Referring to FIGS. 9 and 10, the plate portion WP_PLT may include at least one protrusion WP_PT.

The protrusion WP_PT may be disposed on the other side of the plate portion WP_PLT opposite to the side of the plate portion WP_PLT connected to the shaft coupling portion WP_SC. The protrusion WP_PT may protrude in a direction crossing the movement direction of the sliding member SLM and may be inserted into a guide groove GL, which will be described later in more detail.

Referring to FIGS. 6 to 10, the display device 1 may further include the shaft member SFT disposed on one side of the sliding member SLM.

The shaft member SFT may penetrate through the shaft coupling portion WP_SC of the plate member WP and one side of the sliding member SLM. As shown in FIGS. 9 and 10, the shaft member SFT may have a cylindrical shape extended in the second direction Y.

Referring to FIGS. 8 to 10, the second base member BS2 may include the guide groove GL for guiding the rotation angle of the plate member WP.

At least a part of the guide groove GL may be disposed between the hinge member HG and the sliding member SLM. In the cross section, at least a part of the guide groove GL may overlap with the one side of the sliding member SLM that faces the hinge member HG in the second direction Y. The guide groove GL may be extended obliquely to the direction in which the sliding member SLM moves.

As shown in FIGS. 6 and 7, in the first state and the second state, the guide groove GL may be extended from one side of the second base member BS2 connected to the hinge member HG to the other side of the second base member BS2 opposite to the side. The distance from the lower surface of the display module DM (display panel DP) may increase toward the other side of the second base member BS2.

The height of the guide groove GL measured from the bottom surface of the second base member BS2 may decrease toward the other side of the second base member BS2. The guide groove GL may be disposed on an inner surface of the second base member BS2 facing the sliding member SLM and forming an inner space of the second base member BS2, but the present disclosure is not limited thereto.

Referring to FIGS. 7 and 8, the display panel DP may be bent with a curvature in the second state and the third state. In the following description, the portion of the display panel DP that is bent when the display device 1 is folded is referred to as a curved portion DP_CV for convenience of illustration.

As shown in FIG. 7, in the second state, one end of the display panel DP disposed on the third base member BS3 and the opposite end of the display panel DP disposed on the first base member BS1 may be aligned with each other in the thickness direction. The one edge and the opposite edge of the display panel DP may include one edge of the display panel DP disposed on the third base member BS3 and the other edge of the display panel DP disposed on the first base member BS1, respectively.

When the display device transits from the second state to the third state, the sliding member SLM may slide in a direction toward one end (one edge) of the display panel DP disposed on the third base member BS3 in cross section. The sliding member SLM may move a part (one side) of the display panel DP disposed on the third base member BS3 in the direction. In such case, the plate member WP may rotate in the thickness direction of the display panel DP, for example, in the downward direction and/or counterclockwise direction of FIG. 8 to increase the curvature of the curved portion DP_CV Accordingly, the area of the upper surface of the display panel DP exposed to the outside may increase.

As the plate member WP rotates, a part of the display panel DP that is not exposed to the outside and is connected to the curved portion DP_CV to be positioned on the plate member WP may also rotate in the thickness direction around a point of the display panel DP, e.g., a point overlapping the shaft member SFT in the thickness direction. The thickness direction may refer to a direction in which the curvature of the curved portion DP_CV decreases, for example, the downward direction and/or the counterclockwise direction in FIG. 8.

On the contrary, when the display device transits from the third state to the second state, the sliding member SLM may slide in a direction opposite to the direction. The sliding member SLM may move a part (one side) of the display panel DP disposed on the third base member BS3 in the opposite direction. In such case, the plate member WP may rotate in the thickness direction of the display panel DP, for example, in the upward direction and/or clockwise direction of FIG. 8 to decrease the curvature of the curved portion DP_CV Accordingly, the area of the upper surface of the display panel DP exposed to the outside may decrease.

As the plate member WP rotates, a part of the display panel DP that is not exposed to the outside and is connected to the curved portion DP_CV to be positioned on the plate member WP may also rotate around the point of the display panel DP in a direction in which the curvature of the curved portion DP_CV decreases, e.g., in the downward direction and/or counterclockwise direction of FIG. 8.

As shown in FIGS. 7 to 10, the guide groove GL may guide the rotation of the plate member WP in a direction in which the curvature of the curved portion DP_CV decreases when the display device transits from the second state to the third state, and may guide the rotation of the plate member WP in a direction in which the curvature of the curved portion DP_CV increases when t display device transits from the third state to the second state. By virtue of the rotation of the plate member WP as described above, the curvature of the curved portion DP_CV of the display panel DP is controlled when the display device transits between the second state and the third state repeatedly, the stress applied to the curved portion DP_CV can be reduced.

When the display device transits from the second state to the third state or vice versa, the distance between the sliding member SLM and the hinge member HG may vary.

When the display device transits from the second state to the third state, the sliding member SLM may move in a direction in which the distance between the sliding member SLM and the hinge member HG increases. In such case, the plate member WP may rotate in a direction in which the curvature of the curved portion DP_CV decreases.

When the display device transits from the third state to the second state, the sliding member SLM may move in a direction in which the distance between the sliding member SLM and the hinge member HG decreases. In such case, the plate member WP may rotate in a direction in which the curvature of the curved portion DP_CV increases.

That is to say, the above-described one direction may refer to a direction in which the distance between the sliding member SLM and the hinge member HG increases, and the opposite direction may refer to a direction in which the distance between the sliding member SLM and the hinge member HG decreases.

As shown in FIGS. 7 and 8, the curved portion DP_CV may have a first curvature in the second state and a second curvature smaller than the first curvature in the third state. Specifically, when the display device transits from the second state to the third state, the radius of curvature of the curved portion DP_CV may increase from the first radius of curvature R1 to a second radius of curvature R2 greater than it. For example, the second radius of curvature R2 may be approximately 2 to 6 times the first radius of curvature R1. As another example, the first radius of curvature R1 of the first curvature may be approximately 0.5 mm to 3.5 mm, and the second radius of curvature R2 of the second curvature may be approximately 3.5 mm to 4.5 mm. It should be understood that the present disclosure is not limited thereto. On the contrary, when the display device transits from the third state to the second state, the size of the portion where the curved portion DP_CV of the display panel DP is formed may decrease. Specifically, when the display device transits from the third state to the second state, the radius of curvature of the curved portion DP_CV may decrease from the second radius of curvature R2 to the second radius of curvature R21 greater than it.

When the display device transits from the second state to the third state, the size of the portion where the curved portion DP_CV of the display panel DP is formed may increase. When the display device transits from the third state to the second state, the size of the portion where the curved portion DP_CV of the display panel DP is formed may decrease.

Referring to FIGS. 6 to 8, the display device 1 may further include a support member SF disposed in the first non-folding area NFA1.

The support member SF may be disposed on the lower surface of the display panel DP to support the display panel DP. The support member SF may be disposed to cover at least a part of the lower surface of the display panel DP. The support member SF may be spaced apart from the sliding member SLM with the folding area therebetween. The support member SF may be interposed between the display module DM and the first base member BS1. At least a part of the first rigid member RG1 may be mounted and fixed on the upper portion of the support member SF. For example, as shown in FIG. 6, a step is formed at the upper portion of the support member SF, so that a part of the first rigid member RG1 may be mounted and fixed on the upper portion of the support member SF. As shown in FIGS. 6 to 8, the support member SF may be disposed on the lower surface of the display panel DP in the first state in parallel with the sliding member SLM in the first direction X. The support member SF may be disposed to face the sliding member SLM in the second state and/or the third state. The support member SF may be disposed such that at least partially overlaps with the sliding member SLM in the thickness direction in the second state and the third state. The area in which the sliding member SLM and the support member SF overlap each other in the thickness direction in the second state may be greater than the area in which the sliding member SLM and the support member SF overlap each other in the thickness direction in the third state. It should be understood that the present disclosure is not limited thereto. The area in which the sliding member SLM and the supporting member SF overlap each other may vary depending on the design of the display device.

The first base member BS1 and the second base member BS2 may include a first sidewall SW1 and a second sidewall SW2, respectively.

The first sidewall SW1 may be disposed on one side of the support member SF that faces the hinge member HG. The first sidewall SW1 may protrude from the bottom surface forming the inner space of the first base member BS1. The first sidewall SW1 may support the side of the support member SF to prevent the support member SF from fluctuating.

The second sidewall SW2 may be disposed on one side of the sliding member SLM that faces the hinge member HG. The second sidewall SW2 may protrude from the bottom surface forming the inner space of the second base member BS2. As shown in FIGS. 6 to 8, the second side wall SW2 may be in contact with or spaced apart from the side of the sliding member SLM as the sliding member SLM moves, to restrict the moving distance of the sliding member SLM. The second sidewall SW2 may be in contact with the sliding member SLM in the first state and the second state, but may be spaced apart from the sliding member SLM in the third state.

Referring to FIGS. 6 to 8, a portion of the display panel DP that is disposed on the support member SF may be attached on the support member SF. Likewise, a portion of the display panel DP that is disposed on the sliding member SLM may be attached on the sliding member SLM. Accordingly, when the display device transits from the first state to the third state, the position of the display panel DP relative to the support member SF and the sliding member SLM may be fixed. A portion of the display panel DP disposed on the plate member WP may not be attached to the plate member WP, but the embodiments described herein are not limited thereto.

In FIG. 6, the display panel DP may be disposed directly on and attached to the support member SF, but the embodiments described herein are not limited thereto. At least one layer may be further interposed between the display panel DP and the support member SF. The at least one layer may include, for example, at least one of the lower stack structures LS shown in FIG. 4. In some implementations, as the at least one layer, the display device 1 may include an adhesive layer interposed between the display panel DP and the support member SF to attach the display panel DP to the support member SF.

According to an embodiment, as shown in FIG. 6, the display panel DP may be attached across the support member SF, the first rigid member RG1, the sliding member SF and the second rigid member RG2. It should be understood that the embodiments described herein are not limited thereto. The shapes of the support member SF and the sliding member SF may vary to support the display panel DP, and the display panel DP may be attached only to the support member SF and/or the sliding member SF. In some implementations, at least one of the first and second rigid members RG1 and RG2 may be eliminated.

Referring to FIGS. 6 to 8, the display panel DP may include a first unattached region UAR. The first unattached region UAR may be located in the first non-folding area NFA1. The first unattached region UAR may refer to a portion of the display panel DP that is disposed on the support member SF but is not attached to the support member SF. Specifically, in the first non-folding area NFA1, only a part of the portion of the display panel DP that overlaps the support member SF in the thickness direction may be attached to and fixed to the support member SF, and the remaining part may not be attached to the support member SF. In FIGS. 6 to 8, the first unattached region UAR is located only on the support member SF, but the embodiments described herein are not limited thereto. The first unattached region UAR may be disposed across the support member SF and the first rigid member RG1. An adhesive layer bonding between the display panel DP and the support member SF may be interposed between the display panel DP and the support member SF, and the first unattached region UAR may refers to a portion of the display panel DP overlapping the display panel DP where the adhesive layer is not interposed and thus is not bonded by the adhesive layer.

As shown in FIGS. 6 to 8, the first unattached region UAR may overlap the support member SF and/or the first base member BS1 in the thickness direction. In the first state, the first unattached region UAR may not overlap the sliding member SF, the plate member WP, the second base member BS2, or the third base member BS3. In the second state, the first unattached region UAR may overlap at least one of the sliding member SF, the plate member WP and the second base member BS2 in the thickness direction. For example, as shown in FIG. 7, in the second state, the first unattached region UAR may overlap the sliding member SF, the plate member WP and the second base member BS2 in the thickness direction. It should be understood that the present disclosure is not limited thereto. In the third state, the first unattached region UAR may overlap the curved portion DP_CV of the display panel DP. In this instance, the first unattached region UAR may not overlap with at least one of the plate member WP and the sliding member SLM. For example, in the third state, the first unattached region UAR may be disposed so that it overlaps none of the plate member WP and the sliding member SLM, but the embodiments described herein are not limited thereto.

In the first state and the second state, the first unattached region UAR may be in close contact with the support member SF, and may be spaced apart from the support member SF in the third state. As shown in FIG. 8, when the display device transits from the second state to the third state, the first unattached region UAR may be spaced apart from the support member SF. Specifically, when the display device transits from the second state to the third state, the sliding member SF may move in a direction away from the first rotation axis RX1, the second rotation axis RX2 and/or the hinge member HG including them, and a portion of the display panel DP attached to the sliding member SF may be pulled by the sliding member SF. In such case, the first unattached region UAR may be bent with a curvature and may be spaced apart from the support member SF. Then, the first unattached region UAR may form a part of the curved portion DP_CV. The first unattached region UAR may gradually spaced apart from a portion disposed on one end of the support member SF facing the hinge member HG as the sliding member SLM moves away from the hinge member HG.

When the display device transits from the second state to the third state, the curved portion DP_CV of the display panel DP may be bent with a second curvature smaller than the first curvature by the space formed as the sliding member SF slides and the plate member WP rotates. As described above, the second radius of curvature R2 of the second curvature may be greater than the first radius of curvature R1 of the first curvature. As the display panel DP has the first unattached region UAR, it can be bent with a more gentle curvature, and thus stress applied to the display panel DP can be mitigated.

Figure 11:
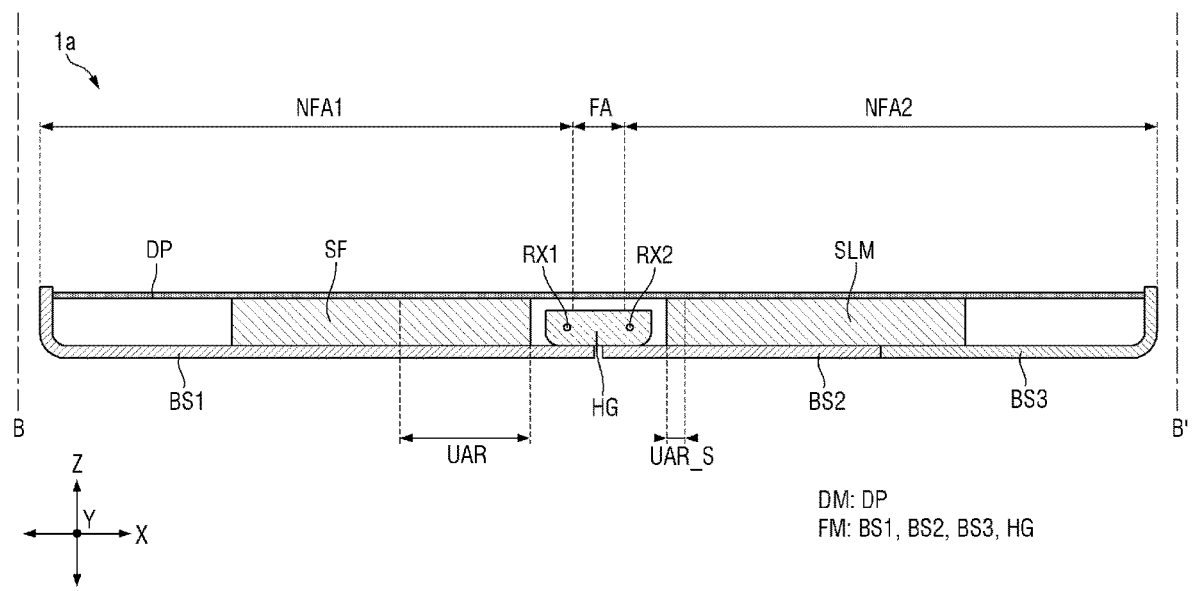
FIG. 11 is a perspective view of a display device according to another embodiment in a first state.
Figure 12:
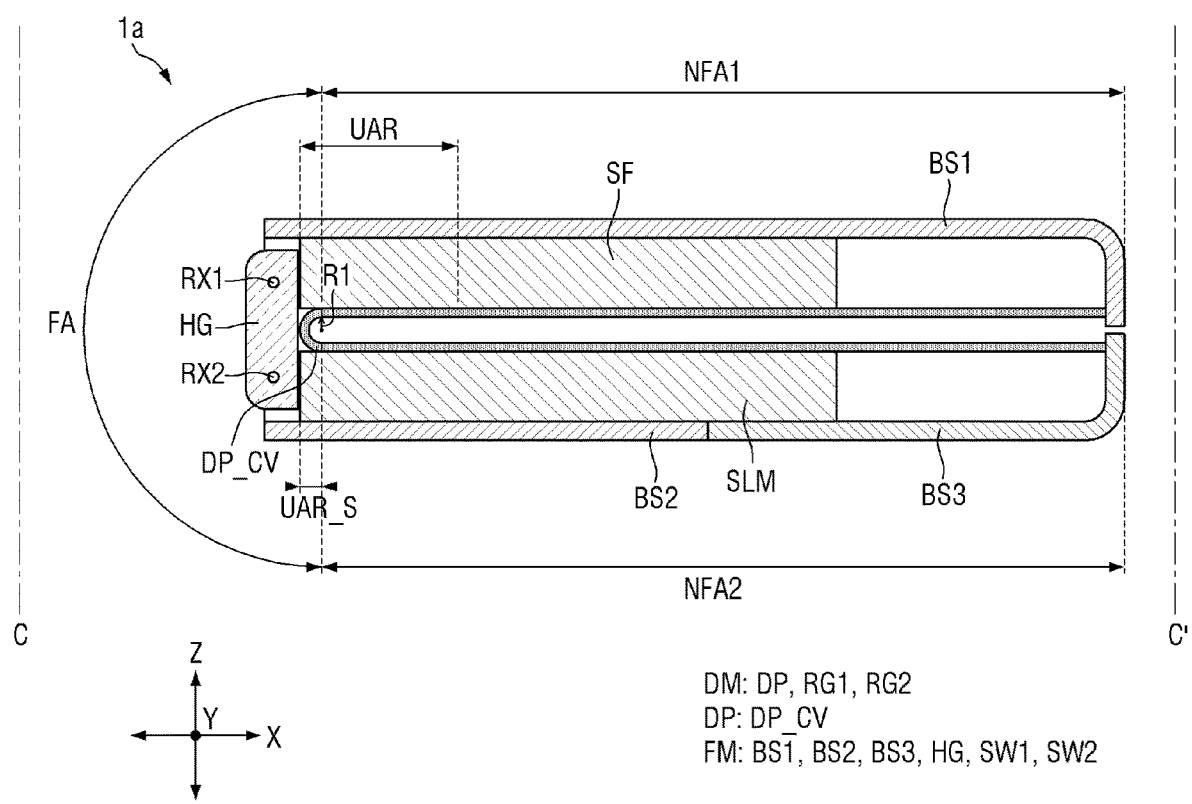
FIG. 12 is a perspective view of a display device according to another embodiment in a second state.
Figure 13:
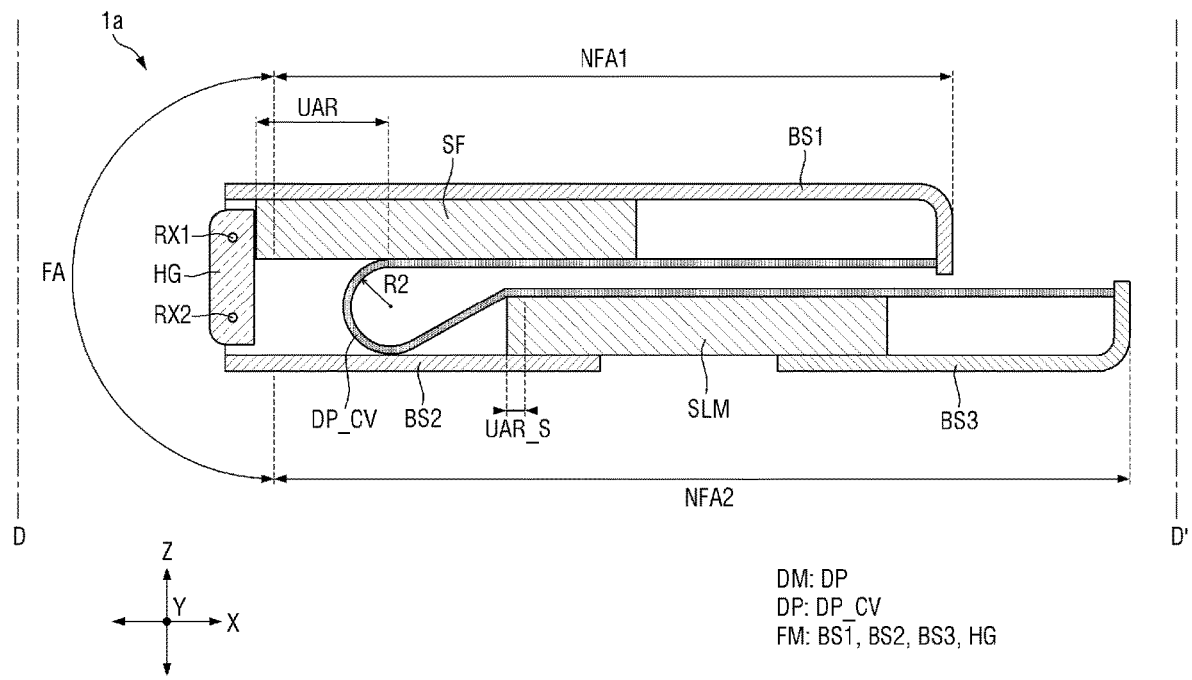
FIG. 13 is a perspective view of a display device according to another embodiment in a third state.
Figure 14:
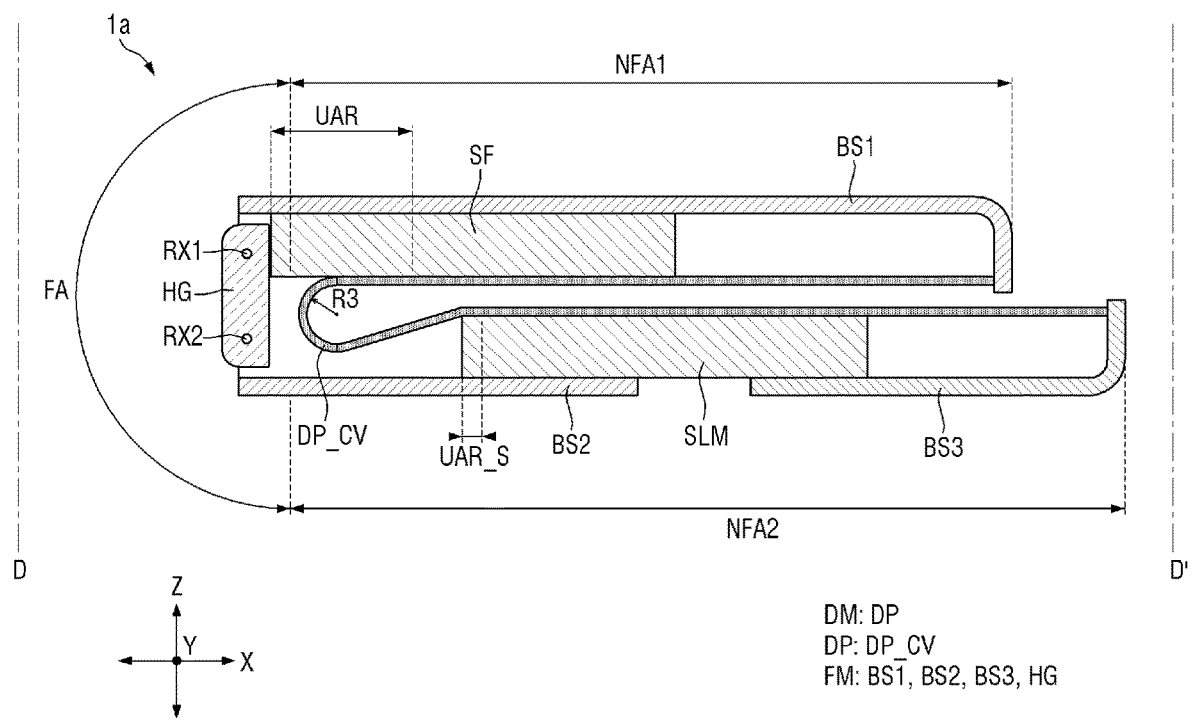
FIG. 14 is a cross-sectional view of the display device according to another embodiment in the course of the transition from the third state to the second state.

FIG. 11 is a cross-sectional view of the display device 1 according to another embodiment in a first state. FIG. 12 is a cross-sectional view of the display device 2 according to another exemplary embodiment in a second state. FIG. 13 is a cross-sectional view of the display device 3 according to another embodiment in a third state. FIG. 14 is a cross-sectional view of the display device 1 according to another embodiment in the course of the transition from the third state to the second state.

The embodiment of FIGS. 11 to 14 is different from the embodiment of FIGS. 1 to 10 in that the plate member WP is eliminated.

The following description will focus on the display panel DP of the display module DM. The display panel DP may refer to the entire display module DM including it, or may refer to at least one of the display panel DP, the upper stack structure US and the lower stack structure LS.

Referring to FIGS. 11 to 14, a display device 1a may include a display panel DP, a support member SF, a sliding member SF, a first base member BS1, a second base member BS2, a third base member BS3 and a hinge member HG. Unlike the exemplary embodiment of FIGS. 1 to 10, the first rigid member RG1 and the second rigid member RG2 may be further eliminated. It should be understood that the present disclosure is not limited thereto. In some exemplary embodiments, in a manner substantially the same as or similar to that shown in FIGS. 1 to 10, the first rigid member RG1 and the second rigid member RG2 may be interposed between the display panel DP and the support member SF and between the display panel DP and the sliding member SF.

As described above, the display panel DP may be disposed across the first non-folding area NFA1, the folding area FA, and the second non-folding area NFA2. The display panel DP may be disposed on the support member SF disposed in the first non-folding area NFA1 and the sliding member SLM disposed in the second non-folding area NFA2.

The display panel DP may be attached to the upper surface of the support member SF and/or the upper surface of the sliding member SF. The upper surface may refer to the surface facing the display panel DP. The upper surface may be opposite to of the lower surface that faces the first base member BS1, the second base member BS2 and/or the third base member BS3.

The display panel DP may be attached directly on the upper surface of the support member SF and/or the upper surface of the sliding member SF, but the present disclosure is not limited thereto. In some implementations, at least one other layer may be interposed between the display panel DP and the supporting member SF and/or between the display panel DP and the sliding member SF for supporting and bonding the display panel DP. For example, referring to FIGS. 6 to 8, the at least one other layer may be the first rigid member RG1 and the second rigid member RG2. In this instance, as shown in FIGS. 6 to 8, a part of the display panel DP located in the first non-folding area NFA1 may be attached to the support member SF and/or the first rigid member RG1, and a part of the display panel DP located in the second non-folding area NFA2 may be attached to the sliding member SF and/or the second rigid member RG2. It should be understood that the embodiments described herein are not limited thereto.

As described above, the display panel DP may include the first unattached region UAR. The first unattached region UAR may be located in the first non-folding area NFA1. The first unattached region UAR may refer to a portion of the display panel DP that is disposed on the upper surface of the support member SF but is not attached to the support member SF. In some implementations, when the first rigid member RG1 is interposed between the display panel DP and the support member SF, the first unattached region UAR may refer to the portion of the display panel DP that is disposed on the upper surface of the first rigid member RG1 but is not attach to the first rigid member RG1.

As shown in FIGS. 11 to 13, in the first state, the first unattached region UAR may overlap the support member SF and/or the first base member BS1 in the thickness direction. In the second state, the first unattached region UAR may overlap with the support member SF, the curved portion DP_CV of the display panel DP, and the sliding member SF in the thickness direction. In the third state, the first unattached region UAR may form a part of the curved portion DP_CV of the display panel DP. In this instance, the first unattached region UAR may not overlap with the sliding member SF in the thickness direction. It should be understood that the embodiments described herein are not limited thereto. In the third state, the first unattached region UAR may overlap only with a part of the sliding member SF in the thickness direction.

In the first state and the second state, the first unattached region UAR may be in close contact with the support member SF, and may be spaced apart from the support member SF in the third state. In the second state, the curved portion DP_CV may overlap the support member SF in the thickness direction, and a part of the first unattached region UAR disposed at one end of the support member SF facing the hinge member HG may be slightly spaced apart from the upper surface of the support member SF, to form a part of the curved portion DP_CV It should be understood that the embodiments described herein are not limited thereto.

As shown in FIG. 13, when the display device transits from the second state to the third state, the first unattached region UAR may be spaced apart from the support member SF. Specifically, when the display device transits from the second state to the third state, the sliding member SF may move in a direction away from the first rotation axis RX1, the second rotation axis RX2 and/or the hinge member HG including them, and a portion of the display panel DP attached to the sliding member SF may be pulled by the sliding member SF. A part of the display panel DP located on the first unattached region UAR may be bent and spaced apart from the support member SF. The first unattached region UAR may gradually spaced apart from a portion disposed on one end of the support member SF facing the hinge member HG as the sliding member SLM moves away from the hinge member HG.

When the display device transits from the second state to the third state, the change in the size of the curved portion DP_CV, the changes in the curvature and in the radius of curvature of the curved portion DP_CV may be substantially equal to those in the exemplary embodiment of FIGS. 6 to 8.

Referring further to FIG. 14, the display device 1*a* may transit from the third state to the second state. In doing so, a part of the display panel DP located in the second non-folding area NFA2 may be attached to the sliding member SF and may slide together with the sliding member SF. A part of the display panel DP may be pushed in toward the hinge member HG, the first rotation axis RX1, and/or the second rotation axis RX2. In this instance, the curved portion DP_CV may have a third radius of curvature R3 that is equal to or greater than the first radius of curvature R1 and equal to or less than the second radius of curvature R2. During the transition from the third state to the second state, the size of the third radius of curvature R3 is gradually decreased, so that the radius of curvature of the curved portion DP_CV may gradually change from the second radius of curvature R2 to the first radius of curvature R1.

A part of the display panel DP may be attached to the rigid sliding member SF and may move together with the sliding member SF. Accordingly, when the display device 1*a* transits from one of the states to another, the curvature and radius of curvature of the curved portion DP_CV can be naturally changed. In addition, it is possible to prevent the bucking of the display panel DP, which may occur when the display panel DP is pushed toward the hinge member HG, the first rotation axis RX1 and/or the second rotation axis RX2 without the sliding member SF.

The display panel DP may further include a second unattached region UAR_S. The second unattached region UAR_2 may be located in the second non-folding area NFA2. The second unattached region UAR_2 may refer to a portion of the display panel DP that is disposed on the upper surface of the sliding member SLM but is not attached to the sliding member SLM. In some implementations, when the second rigid member RG1 is interposed between the display panel DP and the sliding member SLM, the second unattached region UAR_S may refer to the portion of the display panel DP that is disposed on the upper surface of the second rigid member RG2 but is not attach to the second rigid member RG2. The size of the second unattached region UAR_S, for example, the area or the length in the first direction in cross-section may be less than or equal to the first unattached region UAR, but the embodiments described herein are not limited thereto.

Referring to FIGS. 11 to 13, in the first state and the third state, the second unattached region UAR_S may be in contact with the upper surface of the sliding member SF but may be spaced apart from the sliding member SF in the second state. The second unattached region UAR_S may at least partially overlap with the first unattached region UAR in the thickness direction in the second state, and may not overlap with the first unattached region UAR in the thickness direction in the first state and the third state. It should be understood that the present disclosure is not limited thereto. By virtue of the first unattached region UAR and the second unattached region UAR_S, a natural curvature change of the curved portion DP_CV is possible when the display device 1a transit from one state to another, and the stress applied to the display panel DP can be mitigated.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel comprising a first surface where images are displayed, and a second surface opposite to the first surface, the display panel being folded with a curvature;
a sliding member disposed on the second surface of the display panel and configured to slide a part of the display panel so that the curvature of the display panel is changed; and
a plate member disposed on the second surface of the display panel,
wherein the display device is folded around at least one rotation axis,
wherein the sliding member is slidable in a radial direction of the at least one rotation axis, and
wherein the radial direction of the at least one rotation axis comprises a first direction toward an edge of the display panel and a second direction opposite to the first direction,
wherein the plate member rotates in a direction in which the curvature of the display panel decreases when the sliding member moves in a direction in which an area of the first surface of the display panel exposed to an outside of the display device increases.

2. The device of claim 1, wherein the display panel is folded so that the first surface is not exposed to an outside of the display device, and wherein the sliding member is configured to move the part of the display panel so that a part of the first surface of the display panel is exposed to the outside of the display device when the display panel is folded.

3. The display device of claim 1, wherein an area of the first surface of the display panel exposed to the outside of the display device increases when the sliding member moves in the first direction, and
wherein the area of the first surface of the display panel exposed to the outside of the display device decreases when the sliding member moves in the second direction.

4. The display device of claim 1, wherein the curvature of the display panel decreases when the sliding member moves in the first direction, and
wherein the curvature of the display panel increases when the sliding member moves in the second direction.

5. The display device of claim 1, wherein the display panel comprises a curved portion where the curvature is formed when the display panel is folded, and
wherein a size of the curved portion increases when the sliding member moves in the first direction and
wherein the size of the curved portion decreases when the sliding member moves in the second direction.

6. The display device of claim 1,
wherein one side of the plate member is rotatably connected to the sliding member.

7. The display device of claim 6, wherein the plate member rotates in a thickness direction of the display panel so that the curvature of the display panel changes when the sliding member slides.

8. The display device of claim 7,
wherein the plate member rotates in a direction in which the curvature of the display panel increases when the sliding member moves in a direction in which an area of the first surface of the display panel exposed to an outside of the display device decreases.

9. The display device of claim 6, further comprising:
a guide groove extended obliquely to a direction in which the sliding member is moved and configured to guide rotation of the plate member.

10. The display device of claim 9, wherein the plate member comprises a protrusion disposed on an opposite side of the plate member and insertable into the guide groove.

11. The display device of claim 1, further comprising:
a support member disposed on the second surface of the display panel to be spaced apart from the sliding member and facing the sliding member when the display panel is folded.

12. The display device of claim 11, wherein the display panel comprises an unattached region that overlaps with the support member in a thickness direction but is not attached to the support member.

13. The display device of claim 12, wherein the unattached region is in close contact with the support member when the display panel is folded.

14. The display device of claim 12, wherein the unattached region is spaced apart from the support member and is bent so that the curvature of the display panel decreases when the sliding member moves.

15. The display device of claim 14, further comprising:
a hinge member disposed on the second surface of the display panel,
wherein the sliding member is slidable so that a distance between the sliding member and the hinge member is changeable.

16. The display device of claim 15, wherein the curvature of the display panel decreases when the sliding member moves away from the hinge member, and the curvature of the display panel increases when the sliding member moves toward the hinge member.

17. A display device comprising:
a display panel comprising a first surface where images are displayed, and a second surface opposite to the first surface, the display panel being folded with a curvature;
a sliding member disposed on the second surface of the display panel and configured to slide a part of the display panel so that the curvature of the display panel is changed; and
a plate member disposed on the second surface of the display panel, wherein the sliding member comprises an inclined surface extended obliquely to a direction in which the sliding member moves, wherein the plate member rotates in a direction in which the curvature of the display panel decreases when the sliding member moves in a direction in which an area of the first surface of the display panel exposed to an outside of the display device increases.

18. A display device comprising:
a display panel comprising a first surface where images are displayed, and a second surface opposite to the first surface;
a sliding member disposed on the second surface of the display panel and configured to slide the part of the display panel so that a curvature of the display panel changes when the display device is folded; and
a plate member disposed on the second surface of the display panel,
wherein the display device is configured to transit between a first state in which the display panel is flatly unfolded, a second state in which the display device is folded so that the first surface of the display panel is not exposed to an outside of the display device, and a third state in which a part of the display panel slides relative to another part thereof from the second state so that only a part of the first surface of the display panel is exposed to the outside of the display device, and wherein the display panel has a first curvature in the second state and a second curvature smaller than the first curvature in the third state, wherein, in the third state, the display panel comprises a first flat region, a second flat region facing and being parallel to the first flat region, and a bending region connecting the first flat region and the second flat region, wherein the plate member rotates in a direction in which the curvature of the display panel decreases when the sliding member moves in a direction in which an area of the first surface of the display panel exposed to an outside of the display device increases.

19. The display device of claim 18, further comprising:
a support member disposed on the second surface of the display panel to be spaced apart from the sliding member and facing the sliding member when the display panel is folded.

20. The display device of claim 19, wherein the display panel comprises an unattached region that overlaps with the support member in a thickness direction but is not attached to the support member.

* * * * *